United States Patent [19]
Shelleby

[11] Patent Number: 5,476,348
[45] Date of Patent: Dec. 19, 1995

[54] APPARATUS FOR RESTRAINING MASSIVE LOAD IN EVENT OF SUDDEN STOP

[76] Inventor: Frank J. Shelleby, 19 Pinemore Blvd., Sault Ste. Marie, Ontario, P6B 4E4, Canada

[21] Appl. No.: 106,660

[22] Filed: Aug. 16, 1993

[51] Int. Cl.$^6$ ............................. B60P 7/12; B61D 45/00
[52] U.S. Cl. ...................................... 410/49; 410/50
[58] Field of Search .......................... 410/30, 31, 42, 410/47, 49, 50; 188/32

[56] References Cited

U.S. PATENT DOCUMENTS

| | | | |
|---|---|---|---|
| 1,776,935 | 9/1930 | Snyder | 410/30 |
| 1,846,750 | 2/1932 | Patterson | 410/30 X |
| 2,413,744 | 1/1947 | Carter | 410/49 |
| 2,611,495 | 9/1952 | Weaver | 410/49 |
| 3,110,361 | 12/1963 | Hirsch . | |
| 3,807,759 | 4/1974 | Vornberger | 410/50 |
| 3,876,173 | 4/1975 | Cline | 410/50 |
| 4,106,735 | 8/1978 | Partain et al. | 410/49 |
| 4,315,707 | 2/1982 | Fernbach | 410/49 X |

FOREIGN PATENT DOCUMENTS

| | | | |
|---|---|---|---|
| 1041372 | 10/1978 | Canada . | |
| 1177331 | 11/1984 | Canada . | |
| 2494643 | 5/1982 | France | 410/30 |
| 158958 | 5/1957 | Sweden | 410/30 |
| 176474 | 9/1961 | Sweden | 410/30 |

Primary Examiner—Michael S. Huppert
Assistant Examiner—Stephen Gordon
Attorney, Agent, or Firm—Stanley E. Johnson

[57] ABSTRACT

A chock and chock anchor for restraining a massive piece of cargo on the load carrying platform of a transport vehicle and a transport vehicle trailer incorporating the same. The chock anchor is secured to the platform and the chock is detachably mounted thereon. Downwardly extending projections on at least one of the chock anchor and chock cause structural damage to the vehicle platform and platform support structure in the event of a sudden stop. The damaged area provides a recess that the cargo piece projects into thereby confining the cargo, such as a multi-ton coil of steel, to the vehicle.

11 Claims, 2 Drawing Sheets

APPARATUS FOR RESTRAINING MASSIVE LOAD IN EVENT OF SUDDEN STOP

FIELD OF INVENTION

This invention relates generally to a method and apparatus for retaining pieces of cargo on the trailer of a transport vehicle in the event of a sudden stop of the vehicle. The invention is particularly concerned with enhancing the safety of transporting steel coils by tractor trailer from one geographic location to another by road.

BACKGROUND OF INVENTION

Steel coils generally come in a dimension ranging from 3 feet to 8 feet in length and from 2 feet to 6 feet in diameter. Each coil has a weight in the range of 25,000 to 40,000 pounds per coil and on a 48 foot trailer, with the proper configuration of wheels, the pay load could be 90,000 pounds. This could translate into approximately 3 coils per trailer. The coils are sometimes transported substantial distances over public roads. Road accidents and other reasons can cause a truck to stop suddenly and in recent months there has been a substantial increase in accidents where the coils being transported have left the bed of the truck during transport and in some cases have caused fatalities. In the event of a sudden unexpected stop the cargo coils, i.e. cargo pieces, can become a multi-ton sliding or rolling object and obviously can cause considerable damage to anything in its path before coming to rest.

Chocks for anchoring pieces of cargo during transport are known as exemplified by the teachings of U.S. Pat. No. 3,110,361 issued Nov. 12, 1963 to L. Hirsch, Canadian Patent 1,177,331 issued Nov. 6, 1984 to RUD-Kettenbabrik Rieger & Dietz GmbH and Canadian Patent 1,041,372 issued Oct. 31, 1978 to Transco Inc.

To applicant's knowledge there are no known proposals for ensuring the safety of transport of coils of steel because the problem has originated only recently stemming from deregulation in the trucking industry and poor driver training by transport companies which do not generally transport coils but due to an economic recession and/or competition in the trade find themselves doing so.

SUMMARY OF INVENTION

A principal object of the present invention is to provide a method and apparatus of retaining pieces of cargo, such as coils of steel or the like, each of substantial weight, on the trailer on which it is being hauled should the transport vehicle be involved in an extremely rapid stop or accident. By substantial weight what is meant is a cargo piece of a few to many tons in weight.

The invention in its broadest concept involves a method and apparatus for anchoring the load to the trailer such that the anchoring means will cause structural damage to the trailer by the shifting load in a rapid stop situation of the transport vehicle such structural damage providing a recess or hole in the trailer or creating an area of weakness into which the coil of steel or cargo load can drop and thereby confine the cargo piece(s) to the trailer.

In accordance with one aspect of the invention there is provided in the art of transporting goods by a transport vehicle having a load platform supported by beams spaced apart from one another, the improvement comprising means to enhance the safety in transporting one or more pieces of cargo, each of substantial weight, on said platform comprising providing and placing one or more chocks in front of each piece of cargo to restrain forward movement of the same relative to said platform, each chock having a downwardly protruding portion extending below the platform to rip open a selected area of the platform and shift supporting beams in its path and thereby provide a recess for receiving the cargo piece associated with the chock in the event of a sudden stop of the transport vehicle.

In accordance with another aspect of the present invention there is provided apparatus for restraining directional shifting of a cargo piece carried on a load platform of a transport vehicle comprising in combination a chock and a chock anchor which are detachably interconnected and wherein said chock anchor includes a base plate adapted to be fixedly mounted on said load platform and having an opening extending therethrough of predetermined configuration and wherein said chock includes a bottom plate projecting under the cargo piece, an upwardly projecting cargo piece abutting portion and a downwardly protruding part, said downwardly protruding part projecting into said opening in the base plate of said chock anchor, and providing a ripper to cause structural damage to the platform in the event of shifting of the chock and chock anchor by the cargo piece associated therewith during use in the event of the transport vehicle suddenly stopping.

LIST OF DRAWINGS

The invention is illustrated by way of example in the accompanying drawings wherein.

DESCRIPTION OF PREFERRED EMBODIMENT

Figure 1:
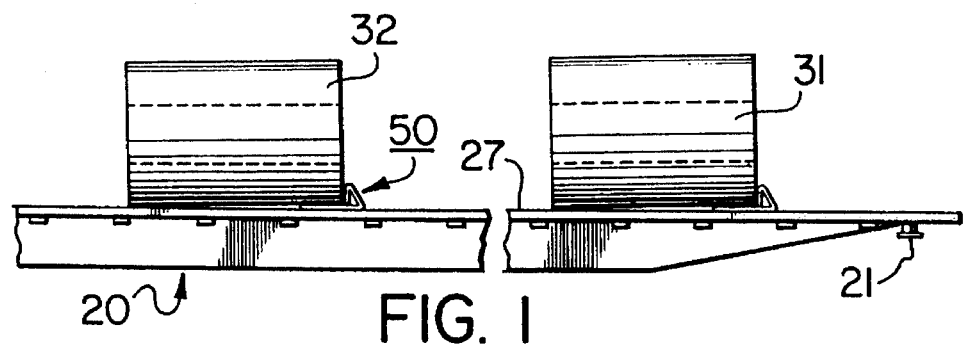
FIG. 1 is a partial side elevational view of the platform portion of a vehicle trailer having two pieces of cargo thereon anchored by a chock and chock anchor provided in accordance with the present invention.
Figure 2:
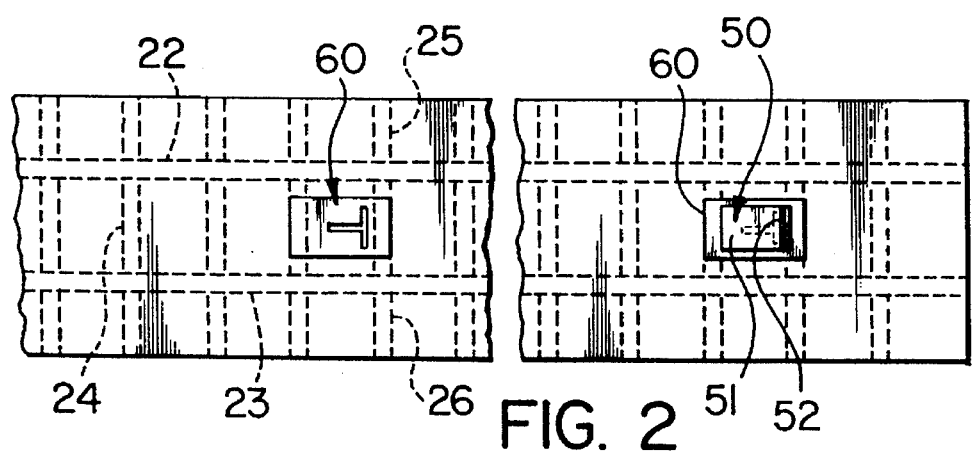
FIG. 2 is a top plan view of FIG. 1 but with the load pieces removed.

Referring to the drawings, there is illustrated in FIGS. 1 and 2 a portion of a flat bed trailer 20 attachable to a tractor (not shown) by a fifth wheel coupling 21 and carried at the other end by a wheeled load carrying unit or units not shown. The flat bed trailer is of conventional construction and includes main beams 22 and 23 extending longitudinally of the trailer and spaced apart from one another in a direction transverse to the length of the trailer. A plurality of cross beams 24 extend from one to the other of main beams 22 and 23. Struts 25 and 26 project outwardly from respective beams 22 and 23. The main beams, cross beams and outwardly directed struts provide a supporting structure for a platform or deck 27 that lies on the upper surfaces of the longitudinal beams 22, 23, the cross beams 24 and the outwardly directed struts 25 and 26.

Figure 8:
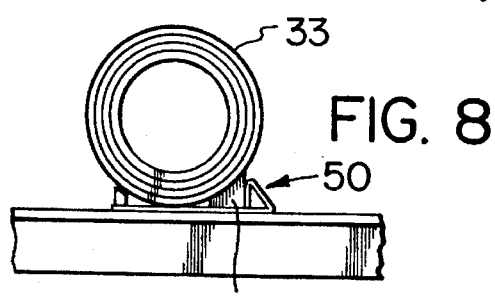
FIG. 8 is a partial side elevational view similar to FIG. 1 but with the roll of steel mounted transversely on the platform.

Referring to FIG. 1 the trailer has two coils of steel designated 31 and 32 mounted on the platform 27. As previously mentioned these coils come in dimensions ranging from 3 feet to 8 feet in length and from 2 feet to 6 feet in diameter. The coils illustrated in FIG. 1 have their coil axis in a direction lengthwise of the trailer. In FIG. 8 there is illustrated a coil of steel 33 mounted with the coil axis perpendicular to the length of the trailer.

The present invention is directed to enhancing the safety during transport by providing a load restrainer referred to herein as a chock for the respective coils that is so designed as to deform the platform in a selected area (preferably between the longitudinal beams) should the transport be involved in an extremely rapid stop or accident causing the coils to shift forwardly. In a broadest aspect of the invention the cargo units 31, 32 and 33 are each restrained from moving forwardly by a chock 50 that has a downwardly protruding portion 53 extending below the platform to serve as a ripper structurally damaging the central portion of the platform between the longitudinal beams 22 and 23 and carrying or shifting forwardly the cross beams 24 in its path. This forms a weakened area in the platform creating an opening or a depression into which the coil can partially drop so as to be confined to the trailer upon a sudden stop rather than sliding off the platform as would otherwise occur. Preferably the platform damage area is such that the coil of steel is between the longitudinal beams.

The chock 50, has three fundamental parts, namely a cargo load bearing part 51 in the form of a flat plate (or saddle if so desired) that projects partly under the coil of steel, an upwardly projecting cargo abutting part or wall 52 and a downwardly protruding lug portion 53 that projects through a hole in the platform of the trailer. The downwardly projecting lug retains the chock in position on the platform and serves as a ripper to damage the platform and cross beam supporting structure therefor in its path in the event of a shift of the cargo relative to the platform due to a sudden stop of the transport vehicle.

In a preferred form the retainer load bearing portion 51 and upwardly projecting portion 52 is a piece of flat heavy plate steel bent and also providing a reinforcing web 54 for the upwardly projecting load abutting portion 52. The lower end of the vertical wall piece 52 is welded as at 55 to the base 51. Alternatively, the load retainer i.e. chock can be a weldment of pieces providing the requisite portions 51, 52, 53.

The downwardly protruding lug portion 53 may be variously shaped but in the preferred form is T-shaped consisting of webs 53A and 53B. These webs 53A and 53B are heavy metal plates welded to and projecting downwardly from the bottom of plate member 51.

The downwardly protruding lug 53 is a positioning lug for the chock and also serves as a ripper in the event of a severe sudden stop by the vehicle. It is positioned by projecting into a correspondingly shaped hole which may be in the platform itself of the transport trailer or in a chock anchor or chock mounting member permanently secured to the platform of the trailer.

In a preferred form the transport trailer is provided with permanently mounted chock anchors 60 located at appropriate positions on the platform and which have a hole or recess 61 correspondingly shaped to and for receiving the downwardly protruding lug 53 on the chock 50. For added strength heavy steel plates form walls providing an extension of the T-shaped recess 61 downwardly below the flat plate 62 of the chock anchor 60.

Figure 4:
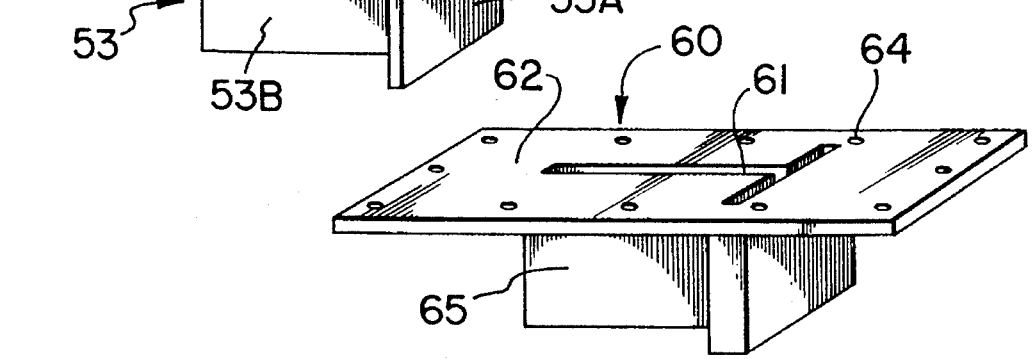
FIG. 4 is a perspective view of a chock anchor securable to the platform of the trailer for receiving the chock of FIG. 3.

The plate 62 may be apertured as indicated at 64 in FIG. 4 for securing it to the platform and/or the cross beams 24. The plate 62 may lie flatwise on top of the platform but preferably is recessed into the platform and two different embodiments of the mountings are shown in FIGS. 6 and 7.

Figure 5:
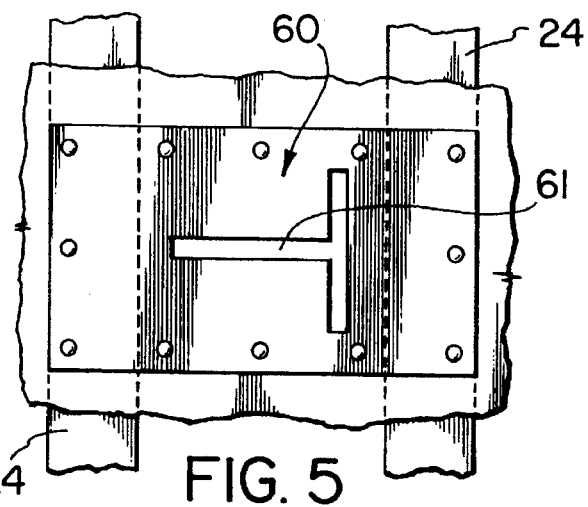
FIG. 5 is a partial top plan view of the chock anchor secured in position on the platform of the trailer.
Figure 6:
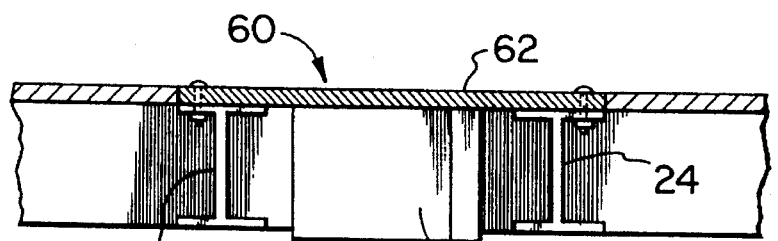
FIG. 6 is a partial sectional side elevational view of FIG. 5.

In FIG. 6 the chock anchor 60, with its downwardly protruding walls 65 forming the T-shaped opening 61 is shown with its plate 62 attached at respective opposite ends to two adjacent cross beams 24 of the trailer platform structure. The plate 62 is illustrated as having the top face thereof flush with the top of the platform and is fastened as by welding and/or bolts to the respective spaced apart cross beams 24. A top plan view of the chock anchor 60 of FIG. 6 is shown in FIG. 5.

Figure 7:
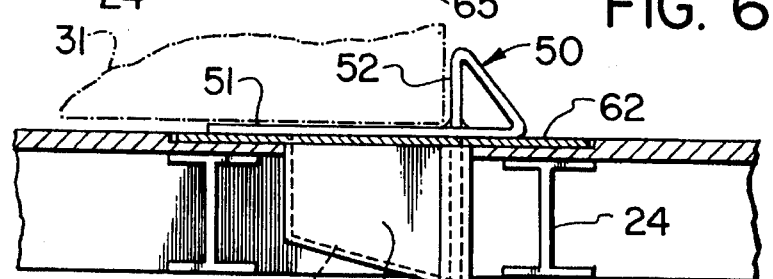
FIG. 7 is similar to FIG. 6 illustrating a minor modification.

In the embodiment illustrated in FIG. 7 plate 62 is recessed into the platform and it is fastened thereto by a series of bolts, and/or screws or the like through holes 64.

FIG. 7 illustrates, in partial section, a chock 50 having the front bottom end portion of the coil steel 31 resting on the load bearing plate 51 and with the load abutment portion 52, extending upwardly along the end of the lower portion of the coil. The downwardly projecting lug 53 fits into a correspondingly shaped hole in the plate 62 and downwardly protruding portion 65 of the chock anchor 60. At least one of the members 53 and 65 have at least the leading edge thereof, i.e. the edge closest to the front of the trailer, projecting a distance downwardly to a position below the lower most edge of cross beams 24. It will be obvious from FIG. 7 that in the event the load restrainer or chock 50 is pushed forwardly by the load 31 the downwardly protruding portions 53 and 65 will cause the cross beams 24 to be pushed forwardly deforming them and/or ripping them out and at the same time forming a weakened area, providing a recess or a hole in the platform, which will receive a portion of the coil 51. This predetermined area of damage confines the cargo piece 31 to a particular area, i.e. preferably between the beams 22 and 23 of the trailer in the event of accident.

With reference to FIG. 2 coils 31 and 32, for clarity, are not shown on the trailer deck and one chock 50 also has been removed. On the front portion of the trailer illustrated in FIG. 2 the load piece or coil 31 of FIG. 1 is not shown but the chock 50 is shown mounted on the chock anchor 60.

Figure 3:
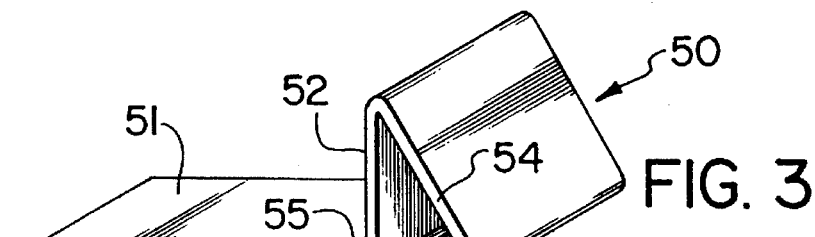
FIG. 3 is a perspective view of the chock used to restrain the cargo pieces in FIG. 1.
Figure 9:
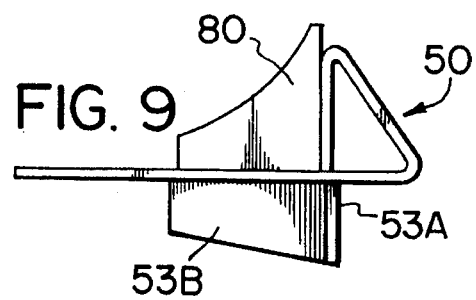
FIG. 9 is a side elevational view of a chock as shown in the other embodiments with a filler block for engaging the piece of cargo to be retained.

In the embodiment illustrated in FIG. 8 the coil of steel 33 is shown transverse to the length of the trailer and a load restrainer or chock of the type illustrated in FIG. 3 is shown holding the cargo in position but because of the curvature of the coil there is an insert 80 placed between the load and the chock 50. The filler piece may be a block of rubber, plastic or other suitable material that will not cause damage to the surface of the wire coil during transport. The chock 50 with the block 80 are illustrated in FIG. 9 with a minor modification being illustrated with respect to the shape of the downwardly projecting lug which in this embodiment is a web 53B. The chock 50 and block 80 can also be used along respective opposite sides of the coils 31 and 32. The length of the filler block 80 may be the length of the coil of steel as may also be the upwardly protruding portion 52 of the load restrainer or chock.

From the foregoing it will be obvious there is provided not only a load restrainer but also one which is designed to deliberately damage a selected predetermined area of the transport trailer in case of a sudden stop so as to ensure the pieces of cargo remain with the trailer rather than fly loose and with its momentum cause damage in its path. Because normal deck trailers are used for the haulage of a variety of loads, one of which may include steel coils, the retainer has been designed to be removable from the base plate, i.e., chock anchor. This makes the trailer more versatile as it is not relegated to only hauling steel coils. The retainer when used with the insert will allow transportation of coils crossways in relationship to the trailer and chains would further fasten the coil to the trailer.

As will be readily apparent the retainer system used without the insert 80 would be for the transportation of coils placed lengthwise in relation to the trailer and would stop forward movement of the coil. The coil would be further secured to the trailer by use of chains which are currently being used.

While the forewording has been described with reference to tractor trailer load haulers the invention in some instances will have application to other load haulers e.g. flat bed trucks, railroad flat bed cars and the like.

I claim:

1. In a transport vehicle, having a load carrying platform with at least one massive piece of cargo thereon and a frame structure under said platform and supporting the platform, said frame structure including spaced apart beams extending longitudinally of the vehicle and spaced apart cross beams connected therebetween, the improvement comprising a chock disposed inboard of said longitudinally extending beams in a blocking position in front of said at least one piece of cargo on said platform to resist forward movement, relative to said platform, of the at least one cargo piece associated therewith, said chock having a first upwardly directed portion disposed in abutting relation with a front end portion of said cargo piece associated therewith, a second load supporting plate-like portion projecting away from said first upwardly directed cargo abutting portion in a direction rearward with reference to a direction of travel of said vehicle, to a position partially under the at least one piece of cargo associated therewith and a third downwardly protruding platform and beam ripper portion, said platform and beam ripper third portion extending through said platform into said frame structure, at least certain ones of said cross beams being located forwardly of said chock in a direction longitudinally of said vehicle and in a path of forward movement, relative to said platform, of said downwardly protruding third portion of said chock whereby in the event of an unexpected sudden deceleration of said vehicle, sufficient so as to cause said at least one cargo piece to move forwardly relative to said platform and wherein said third portion is of sufficient strength, relative to said cross beams, so that there is created, as it is pushed forwardly by said at least one cargo piece, a predetermined weakened area in said platform into which said at least one cargo piece can project and thereby assist in maintaining the at least one cargo piece on said platform while the vehicle comes to a stop.

2. The improvement as defined in claim 1, further including a chock anchor having a base plate fixedly mounted on said load platform and an opening of predetermined configuration extending therethrough, said third downwardly protruding platform and beam ripper portion projecting through said opening in said base plate.

3. The improvement as defined in claim 2, wherein said opening in the base plate of said chock anchor comprises first and second slots disposed at right angles to each other and wherein said third downwardly protruding platform and beam ripper portion of said chock has a pair of webs projecting downward from said second load supporting plate-like portion and disposed at right angles to each other, said webs, in cross-section, having substantially the same shape and size as that of said slots, whereby said webs and slots interfit in mating relation.

4. The improvement as defined in claim 3, wherein said first and second slots and said webs are respectively T-shaped in cross-section.

5. The improvement as defined in claim 4, further including a chock anchor downwardly protruding portion secured to and extending downwardly from said chock anchor base plate, said chock anchor downwardly protruding portion including wall means with a recess therein extending downward from and in alignment with said first and second slots to form an extension of said slots.

6. The improvement as defined in claim 2, wherein said chock anchor base plate and said chock second load supporting plate-like portion are each rectilinear and wherein said chock first upwardly directed portion and chock third portion are substantially in vertical alignment with one another, in side elevational view.

7. The improvement as defined in claim 2, including means fixedly securing said chock second portion to said frame structure underlying said platform.

8. In a fifth wheel type trailer having a load carrying platform with at least one massive piece of cargo thereon and mounted on a frame structure that includes laterally spaced apart beams extending longitudinally of the trailer and a plurality of spaced apart cross beams connected therebetween, the improvement comprising at least one chock anchor fixedly mounted on said platform at a location inboard of said longitudinal beams, said at least one chock anchor having an opening extending therethrough of predetermined configuration and a chock detachably mounted on said at least one chock anchor, said chock being disposed inboard of said longitudinally extending beams in a blocking position in front of said at least one massive cargo piece on said platform to resist forward movement, relative to said platform, of the at least one cargo piece associated therewith, said chock having a first upwardly directed portion disposed in abutting relation with a front end portion of said at least one cargo piece associated therewith, a second load supporting plate-like portion projecting away from said first upwardly directed cargo abutting portion in a direction rearward with reference to a direction of travel of said trailer to a position partially under the at least one piece of cargo associated therewith and a third downwardly protruding platform and beam ripper portion, said platform and beam ripper third portion extending through said chock anchor opening into said frame structure, at least certain ones of said cross beams being located forwardly of said chock and said at least one chock anchor in a direction longitudinally of said trailer and in a path of forward movement, relative to said platform, of said downwardly protruding third portion of said chock whereby in the event of an unexpected sudden deceleration of said trailer, sufficient so as to cause said at least one cargo piece to move forwardly relative to said platform and wherein said third portion is of sufficient strength relative to said cross beams so that, as it is pushed forwardly by said at least one cargo piece, together with said at least one chock anchor, there is created a predetermined weakened area in said platform into which said at least one cargo piece can project and thereby assist in maintaining the at least one cargo piece on said platform while the trailer comes to a stop.

9. The improvement as defined in claim 8, wherein said chock second portion comprises a structural flat metal plate having at a leading end thereof, relative to the direction of travel of the trailer, an upwardly and rearwardly sloping reinforcing flange and a vertical cargo piece abutment extending downwardly from such rearwardly sloping flange into abutting relation with the upper surface of said flat metal plate, wherein said vertical cargo piece abutment is said chock first portion, and wherein said third downwardly protruding portion comprises a metal piece rigidly secured to said structural flat metal plate.

10. The improvement as defined in claim 9, wherein said reinforcing flange, flat metal plate and vertical cargo piece abutment is a single integral piece of metal.

11. The improvement as defined in claim 10, wherein said laterally spaced apart beams comprises a pair of longitudinal beams extending lengthwise of the trailer and spaced apart from one another in a direction transverse thereto with said plurality of cross-beams extending therebetween and wherein said at least one chock anchor is anchored to the cross-beams adjacent thereto.

\* \* \* \* \*